United States Patent
Agarwal et al.

(10) Patent No.: US 7,260,678 B1
(45) Date of Patent: Aug. 21, 2007

(54) SYSTEM AND METHOD FOR DETERMINING DISK OWNERSHIP MODEL

(75) Inventors: Gaurav Agarwal, Sunnyvale, CA (US); Susan M. Coatney, Cupertino, CA (US); Steven S. Watanabe, San Jose, CA (US); Alan L. Rowe, San Jose, CA (US); Samuel M. Cramer, Sunnyvale, CA (US); Gautam Dev Sharma, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 393 days.

(21) Appl. No.: 10/964,185

(22) Filed: Oct. 13, 2004

(51) Int. Cl.
*G06F 12/00* (2006.01)
(52) U.S. Cl. ...................... 711/112; 711/114
(58) Field of Classification Search ............... None
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,426,747 A | 6/1995 | Weinreb et al. |
| 5,581,724 A | 12/1996 | Belsan et al. |
| 6,636,879 B1 | 10/2003 | Doucette et al. |
| 7,107,385 B2 | 9/2006 | Rajan |
| 2003/0120743 A1 | 6/2003 | Coatney et al. |
| 2004/0030668 A1 | 2/2004 | Pawlowski et al. |
| 2005/0237865 A1* | 10/2005 | Ando et al. ............ 369/30.3 |
| 2006/0206671 A1 | 9/2006 | Aiello et al. |

FOREIGN PATENT DOCUMENTS

WO  89/10594  11/1989

OTHER PUBLICATIONS

Basilico, et al., *Error Correction System Using "Shadow Memory,"* IBM Technical Disclosure Bulletin, May 1984, pp. 5792-5793.

(Continued)

*Primary Examiner*—Reginald Bragdon
*Assistant Examiner*—Mehdi Namazi
(74) *Attorney, Agent, or Firm*—Cesari & McKenna, LLP

(57) ABSTRACT

A system and method for determining a disk ownership model to be utilized by a storage system is disclosed. The storage system and method determines the individual disk ownership of each accessible disk to the storage system. If the number of disks utilizing a first ownership model is exceeded, the storage system utilizes the first ownership model. Otherwise, the storage system utilizes a second ownership model.

20 Claims, 7 Drawing Sheets

OTHER PUBLICATIONS

Bitton, Dina, *Disk Shadowing*, Proceedings of the 14th VLDB Conference, LA, CA (1988).

Blasgen, M. W. et al., *System R;An architectural Overview*, Reprinted from IBM Systems Journal Vol. 20, No. 1, 1981 ©1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 78-85, 1990.

Chutani, Sailesh, et al., *The Episode file system*, In Proceedings of the USENIX Winter 1992.

Clark, B. E., et al., *Application System 1400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite* - Computing Systems, 4(4), Fall 1991, pp. 353-385 ?(copy of article I have has no date or cite).

Gait, Jason, *Phoenix: A Safe In-Memory File System*. Communications of the ACM, 33(1):81-86, Jan. 1990.

Hartman, John H. et al., *Performance Measurments of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al. *Scale and performance in a distributed file system*, ACM Trans. Computer. System., 6(1), Feb. 1988 pp. 51-81.

Isomaki, Markus, *Differential Service for the Internet*, Department of Technical Physics and Mathmatics, May 9, 1998.

Kazar, Michael L., et al., *Decorum File System Architectural Overview*USENIX Summer Conference, Anaheim, California, 1990.

Lorie, Raymond, A, *Physical Integrity in a large segmented database*, ACM Trans. Database Systems, (2)1:94-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al., *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al., *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al. *The Sprite Network Operating System*, Computer Science Division, Department of Electrical Engineering and Computer Sciences, Univ. of CA, Berkeley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting faster as Fast as Hardware?*, Digital WRL Technical Note TN-11, Oct. 1989.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16(Sep.1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Rosenberg, J., et al., *Stability in a Persistant Store Based on a Large Virtual Memory*, In Security and Persistance, rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al, *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Designs*, In Proceedings of the 10th ACM Symposium on Operating Systems Principles, (19)5:56-57, Dec. 1985.

Satyanarayanan,.M.. *A survey of distributed file-systems*. Annual Review of Computing Science, 4(73--104), 1989.

Satyanarayanan, M., et al., *Coda: A Highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990:9-21.

Sidebotham, Bob, *Volumes: The Andrew File System Data Structuring Primitive*, EEUG Conference Proceedings, Manchester, UK, Autumn 1986.

Welch, Brent B., et al., *Pseudo Devices: User-Level Extensions to the Sprite File System*, Computer Science Division, Department of Electrical Engineering and Computer Sciences, Univ. of CA, Berkeley, Apr. 1988.

Welch, Brent B., et al., *Pseudo-File-Systems*, Computer Science Division, Department of Electrical Engineering and Computer Sciences, Univ. of CA, Berkeley, Oct. 1989.

Wittle, Mark, et al. *LADDIS: The next generation in NFS file server benchmarking*, USENIX Association Conference Proceedings, Apr. 1993.

* cited by examiner

SYSTEM AND METHOD FOR DETERMINING DISK OWNERSHIP MODEL

FIELD OF THE INVENTION

The present invention relates to storage systems and, in particular, to determining a proper disk ownership model to use with a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a storage system including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

According to a basic disk ownership model each storage system is deemed to "own" the disks that comprise the volumes serviced by that storage system. In this context, ownership means that the storage system is responsible for servicing the data contained on those disks. Only the storage system that owns a particular disk may write data to that disk to thereby ensure data integrity and coherency. In some prior storage system implementations, it is common for each storage system to be connected to a local area network, for example a fibre channel loop, having a plurality of disks attached thereto. Here the storage system is the only device directly connected to the disks via the fibre channel loop and, as such, the storage system owns the disks on that loop. However, a noted disadvantage of this disk ownership model is the lack of scalability, as there is a limit to a number of disks that may be added to a single fibre channel loop. This limitation prevents a system administrator from having backup storage systems connected to the disks in the event of failure.

In another prior storage system implementation, two storage systems as a cluster may be connected to a single disk drive through the use of A/B connectors to the disk. In this type of cluster arrangement, the first storage system is connected to the A connection, while the second storage system is connected to the B connection. According to the "A/B" ownership model implementation, the storage system connected to the disk's A connection is deemed to own that disk. If the disk is arrayed with other disks in a disk shelf, all of the disks contained within that shelf "share" the A and B connections. That is, the storage system connected to the A connection of the disk shelf is deemed to own all of the disks in that shelf, while the storage system connected to the B connection may be deemed to own the disks if the storage system connected to the A connection fails or suffers an error condition.

FIG. 1 is a schematic block diagram of a network environment 100 showing an exemplary A/B disk ownership model environment. The environment 100 is centered around a switching network 102, which may comprise one or more switches coupled to a local area network (LAN), a wide area network (WAN), virtual private network (VPN), or a combination of LAN, WAN and VPN implementations arrayed as switches fabric. One or more clients 104 are interconnected via the network 102 to a Red and Blue storage appliances 300A,B. Illustratively, Red storage appliance is interconnected with network 102 via data pathway 106, while Blue storage appliance is interconnected to network 102 via data pathway 108. Red storage appliance 300A is illustratively connected to the Red disk shelf 112 by A connection 116 and to Blue disk shelf 114 by B connection 118. Similarly, Blue storage appliance 300B is connected to Red disk shelf 112 by B connection 122 and to Blue disk shelf 114 by A connection 120. Thus in this environment, Red storage system 300A owns Red disk shelf 112 and Blue storage system owns Blue disk shelf 114.

Other known disk ownership models may be utilized with a storage system. One alternate ownership model is described in U.S. patent application Ser. No. 10/027,457, entitled SYSTEM AND METHOD OF IMPLEMENTING DISK OWNERSHIP IN NETWORKED STORAGE, by Susan M. Coatney, et al. Such an alternate ownership model may be utilized for disks connected in SAN environment that utilizes a two-part system. The first part of the alternate ownership system involves the writing of ownership information to a predetermined area of each disk, generally described as sector S. This predetermined "ownership" area is described as Sector S and it may comprise multiple disk sectors. The ownership information is illustratively the serial number of the owning storage system is stored in non-volatile RAM (NVRAM) of the storage system. Within the system, this ownership information acts as a definitive ownership attribute. The second part of the ownership system involves the setting of a SCSI-3 persistent reservation to allow only the disk owner to write to the disk. Use of a SCSI-3 persistent reservation allows other storage systems to only read the ownership information from the disks By utilizing this Sector S ownership system and model, any number of storage systems connected to a switching network can read from, but not write to, all of the disks connected to the network. In general, the Sector S ownership system enables any number of storage systems to be connected to the switching fabric of the network with each storage system being able to read data from all of the disks connected to the fabric. Note that only the storage system that presently owns a particular disk can write to a given disk.

One problem of storage systems configured to support multiple disk ownership models is the need to determine the appropriate disk ownership model to be used when initializing the system. A storage subsystem of the storage system typically requires the knowledge of which disks the system owns so that high-level modules of the storage operating system may be configured correctly. For example, a RAID module of a storage operating system requires knowledge of the disks owned by the storage system, so that it is able to assimilate the disks into appropriate RAID groups. If a storage system improperly asserts ownership of a disk by, for example, utilizing an incorrect disk ownership model, data loss may result as the disks are incorporated into RAID groups incorrectly.

One solution for determining the appropriate disk ownership model used by a storage system is to store the appropriate ownership model in a firmware variable associated with the storage system. However, a noted disadvantage of such a solution is that it generates a single point of failure if the firmware variable is accidentally deleted, thereby causing the storage system to possibly utilize an improper disk ownership model. Additionally, in the event that the storage system is migrated (moved) from one storage system environment to another environment that utilizes a different disk ownership model, the storage system will initialize utilizing an improper disk ownership model.

SUMMARY OF THE INVENTION

The disadvantages of the prior art are overcome by providing a system and method for determining a disk ownership model to be used by a storage system configured to support multiple disk ownership models. The system and method determines, upon storage system initialization, the appropriate disk ownership model to be utilized with disks operatively connected with the storage system, which then utilizes the determined disk ownership model to complete the initialization procedure. During initialization, a disk ownership module of a storage operating system executing on the storage system scans all disks that can be accessed by the disk ownership module to identify the disks. Then, for each identified disk, the storage system reads predetermined ownership blocks (e.g. Sector S ownership blocks) from the selected disk and determines the disk ownership model of that disk; (e.g. Sector S or conventional A/B ownership).

Once all disks have been analyzed, the disk ownership module determines if the number of disks with Sector S ownership information identifying the storage system as the disk owner exceeds a first threshold value. If so, the module utilizes the Sector S ownership model. If not, the disk ownership module then determines if the number of disks with Sector S ownership information, regardless of the owning storage system, exceeds a second threshold value. If so, the storage system utilizes the Sector S ownership model; otherwise, the storage system utilizes the conventional A/B ownership model. The threshold values are illustratively set so that if one or more disks are set with the Sector S ownership information and configured so that the initializing storage system is the owner, the storage system utilizes the Sector S ownership model. Additionally, if the number of disks having Sector S ownership information exceeds two, the storage system utilizes the Sector S ownership model. These thresholds may be modified by the system administrator.

In the illustrative embodiment, if a disk or storage system utilizes the A/B ownership model and a disk has Sector S ownership information stored therein, the storage system removes the Sector S ownership information from the disk to prevent incorrect determinations of disk ownership model on future re-initializations.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
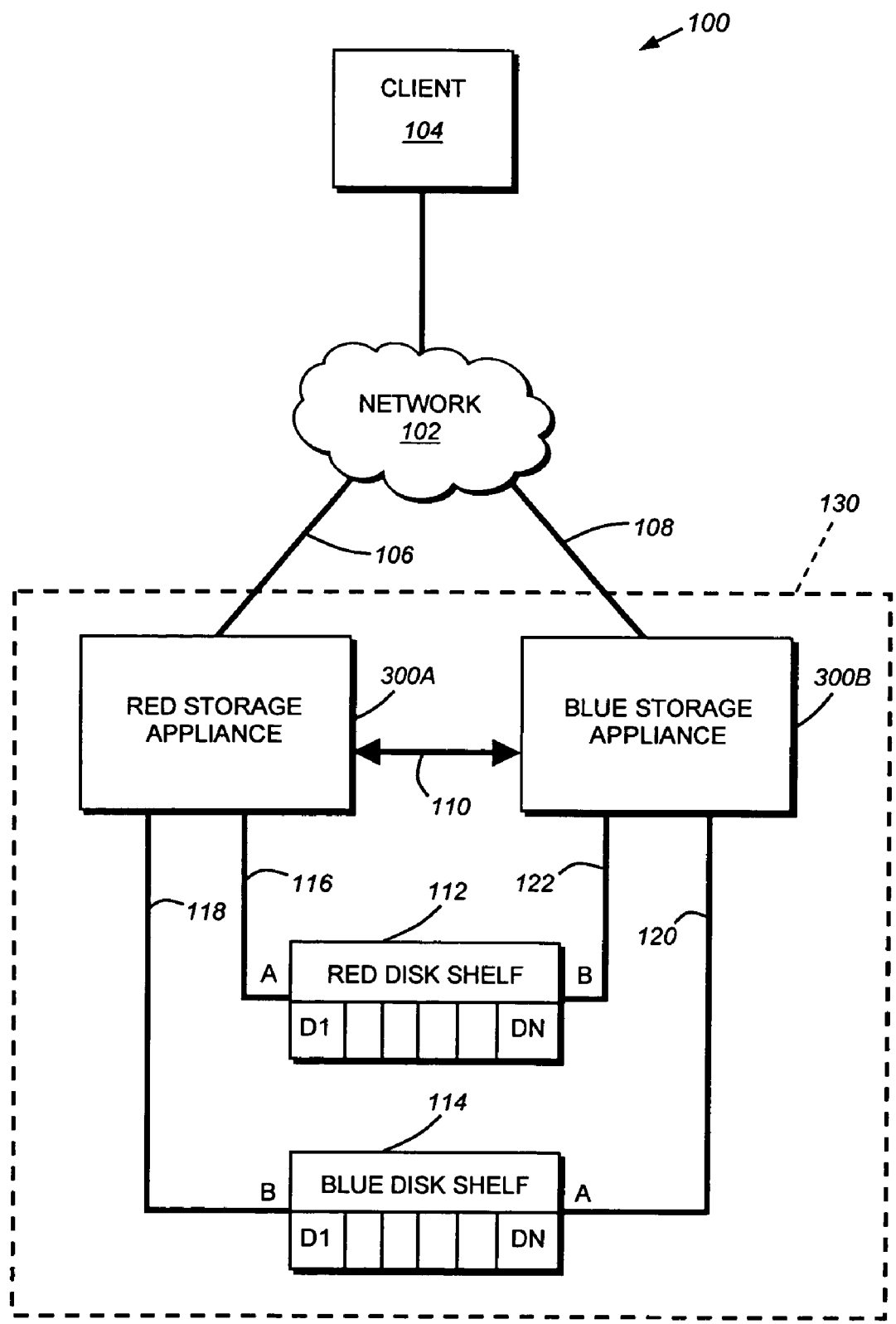
FIG. 1, already described, is a schematic block diagram of an exemplary network environment in accordance with an embodiment of the present invention.
Figure 2:
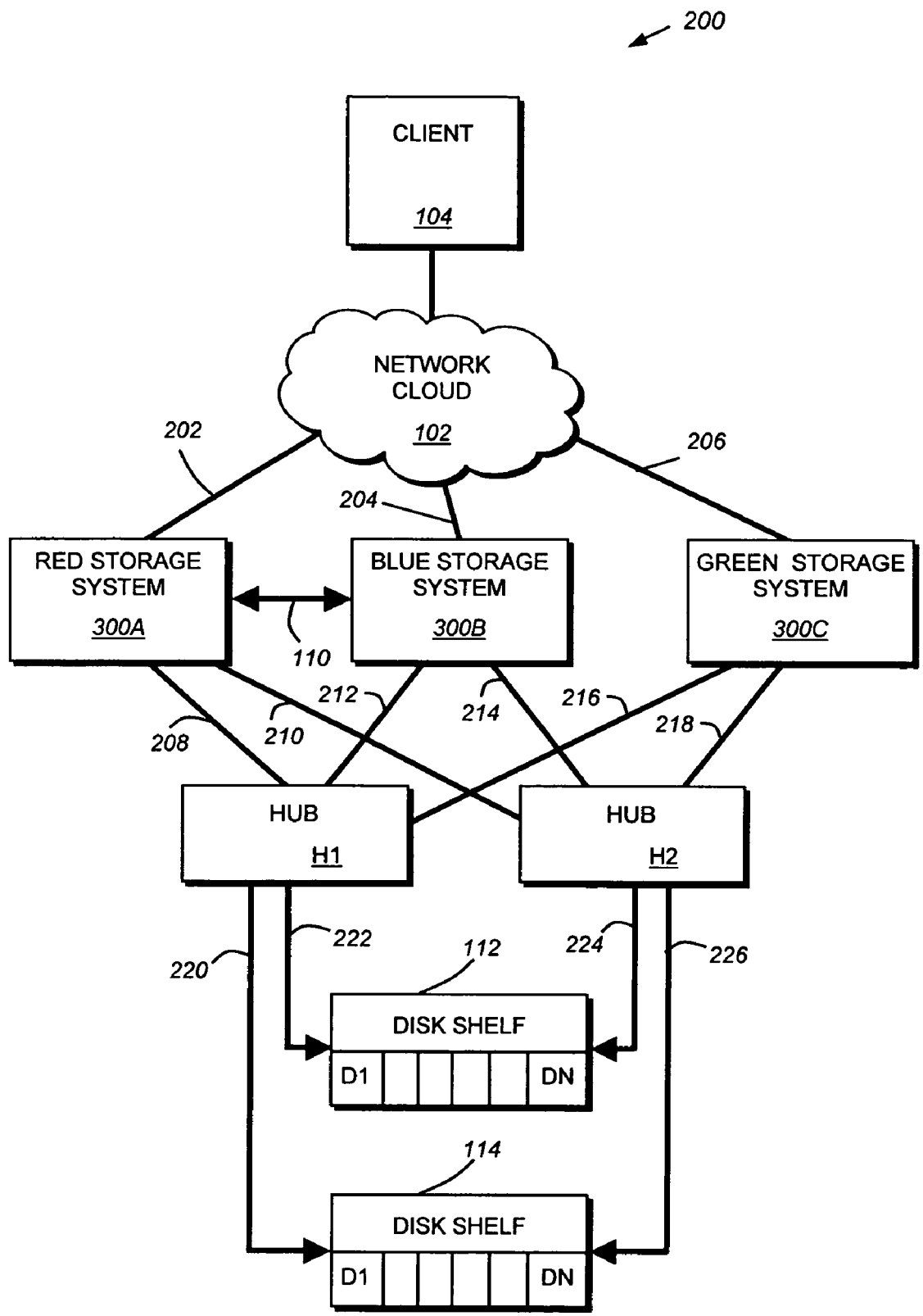
FIG. 2 is a schematic block diagram of an exemplary network storage environment in accordance with an embodiment of the present invention.

FIG. 2 is a schematic block diagram of an exemplary network environment 200 in which the principles of the present invention are implemented. The environment 200 comprises a network 102 coupled to a client 104. The client 104 may be a general-purpose computer, such as a PC or a workstation, or a special-purpose computer, such as an application server, configured to execute applications over an operating system that includes block access protocols. Red Storage System 300A, Blue Storage System 300B and Green Storage System 300C are also connected to the network 102. These storage systems, described further below, are illustratively embodied as storage appliances configured to control storage of and access to interconnected storage devices, such as disks residing on disk shelves 112 and 114.

The Red, Blue and Green storage appliances 300 A, B,C are connected to the network 102 via data pathways 202, 204, 206 respectively. These data pathways 202, 204, 206 may comprise direct point-to-point links or may represent alternate data pathways including various intermediate network devices, such as routers, switches, hubs, etc. Such a network environment is further described in U.S. patent application Ser. No. 11/075,619, entitled COORDINATED SHARED STORAGE ARCHITECTURE, by Anthony Aiello, et al. To that end, environment 200 also includes exemplary hubs H1 and H2 that are interconnected with the storage systems 300 A, B, C. Red storage appliance 300 A is connected to hub H1 via data pathway 208 and to hub H2 via data pathway 210. Similarly, Blue storage appliance 300 B is connected to hub H1 via data pathway 212 and to hub H2 via data pathway 214. Finally Green storage appliance 300C is connected to hub H1 via data pathway 216 and to hub H2 via data pathway 218. Moreover, hub H1 is connected to disk shelf 112 via data pathways 222 and also to disk shelf 114 via data pathway 220. Similarly, hub H2 to is connected to disk shelf 112 via data pathway 224 and to disk shelf 114 via data pathway 226. In it should be noted that such a data pathway can be any acceptable networking media including, for example, a Fibre Channel Arbitrated Loop (FC-AL). In the illustrative embodiment, hubs H1 and H2 are interconnected with both A and B connections of disk shelves 112, 114, thereby providing multiple connections to both disk shelves.

B. Storage Appliance

Figure 3:
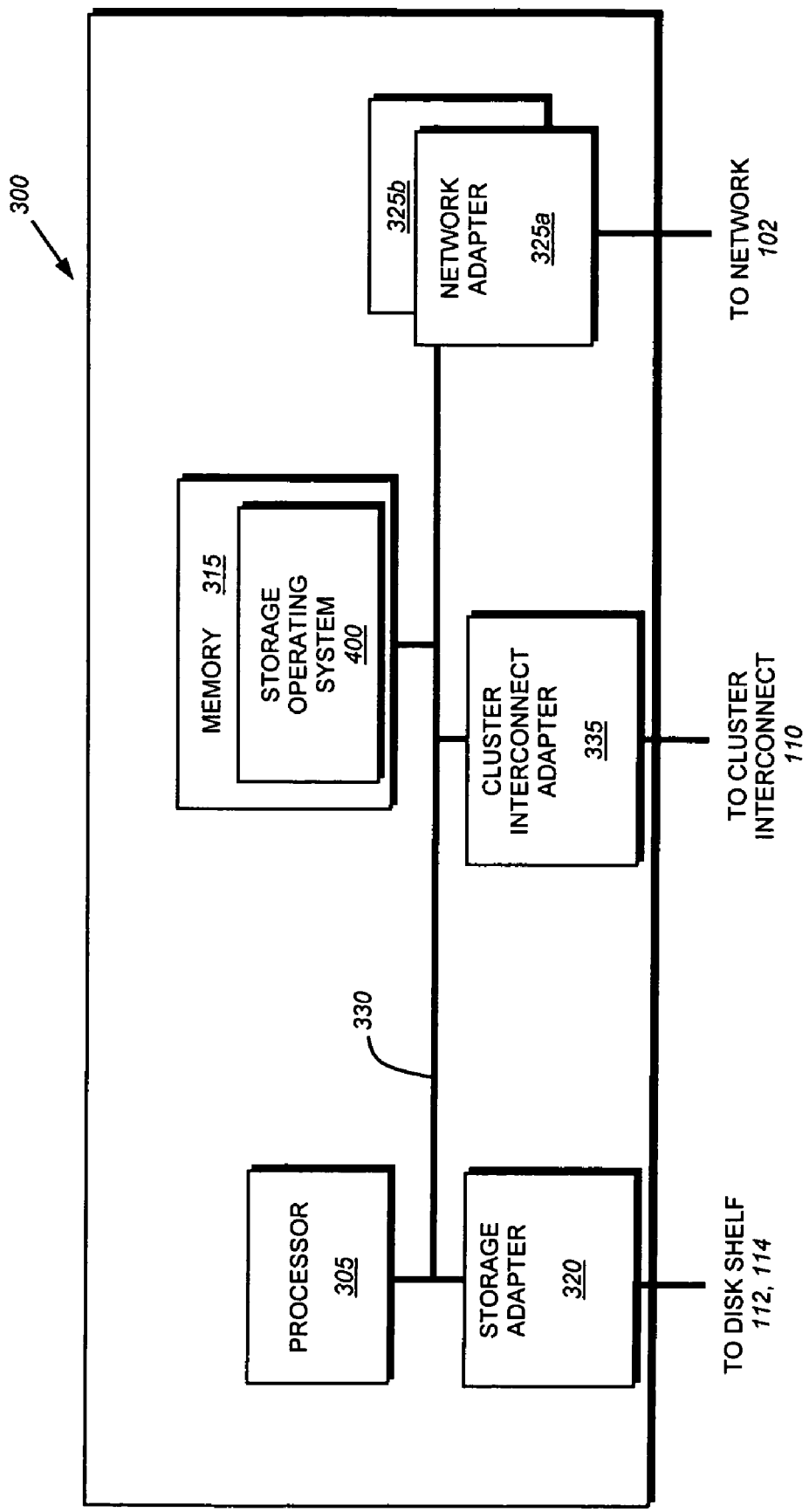
FIG. 3 is a schematic block diagram of an exemplary storage system in accordance with an embodiment of the present invention.

FIG. 3 is a schematic block diagram of an exemplary storage system 300 configured to provide storage service relating to the organization of information on storage devices, such as disks. As noted, the storage system 300 is illustratively embodied as a storage appliance comprising a processor 305, a memory 315, a plurality of network adapters 325a, 325b, a storage adapter 320 and a cluster interconnect adapter 335 interconnected by a system bus 330. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. An example of such a storage appliance is further described in U.S. patent application Ser. No. 10/215,917 entitled MULTI-PROTOCOL STORAGE APPLIANCE THAT PROVIDES INTEGRATED SUPPORT FOR FILE AND BLOCK ACCESS PROTOCOLS by Brian Pawlowski, et al. Note that the terms "storage system" and "storage appliance" are used interchangeably. The storage appliance 300 also includes a storage operating system 400 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage appliance 300 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al. The multi-protocol storage appliance thereafter makes these emulated disks accessible to the SAN clients through controlled exports.

In the illustrative embodiment, the memory 315 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 325a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 325 a, b also couple the storage appliance 300 to a plurality of clients 104 that may be further configured to access the stored information as blocks or disks. The network adapters 325 may comprise a FC host bus adapter (HBA) having the mechanical, electrical and signaling circuitry needed to connect the storage appliance 300 to the network 102. In addition to providing FC access, the FC HBA may offload FC network processing operations from the storage appliance's processor 305. The FC HBAs 325 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ is operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 300.

The storage appliance 300 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 300) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 320 cooperates with the storage operating system 400 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 305 (or the adapter 320 itself) prior to being forwarded over the system bus 330 to the network adapters 325a and b, where the information is formatted into packets or messages and returned to the clients.

Storage of information on the multi-protocol storage appliance 300 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 400 implements a write-anywhere file system that cooperates with novel virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as a set of disk blocks configured to store information, such as data, whereas the directory may be implemented as a set of specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

To facilitate access to the disks, the storage operating system 400 implements a write-anywhere file system that cooperates with virtualization modules to "virtualize" the storage space provided by disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named luns In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 4:
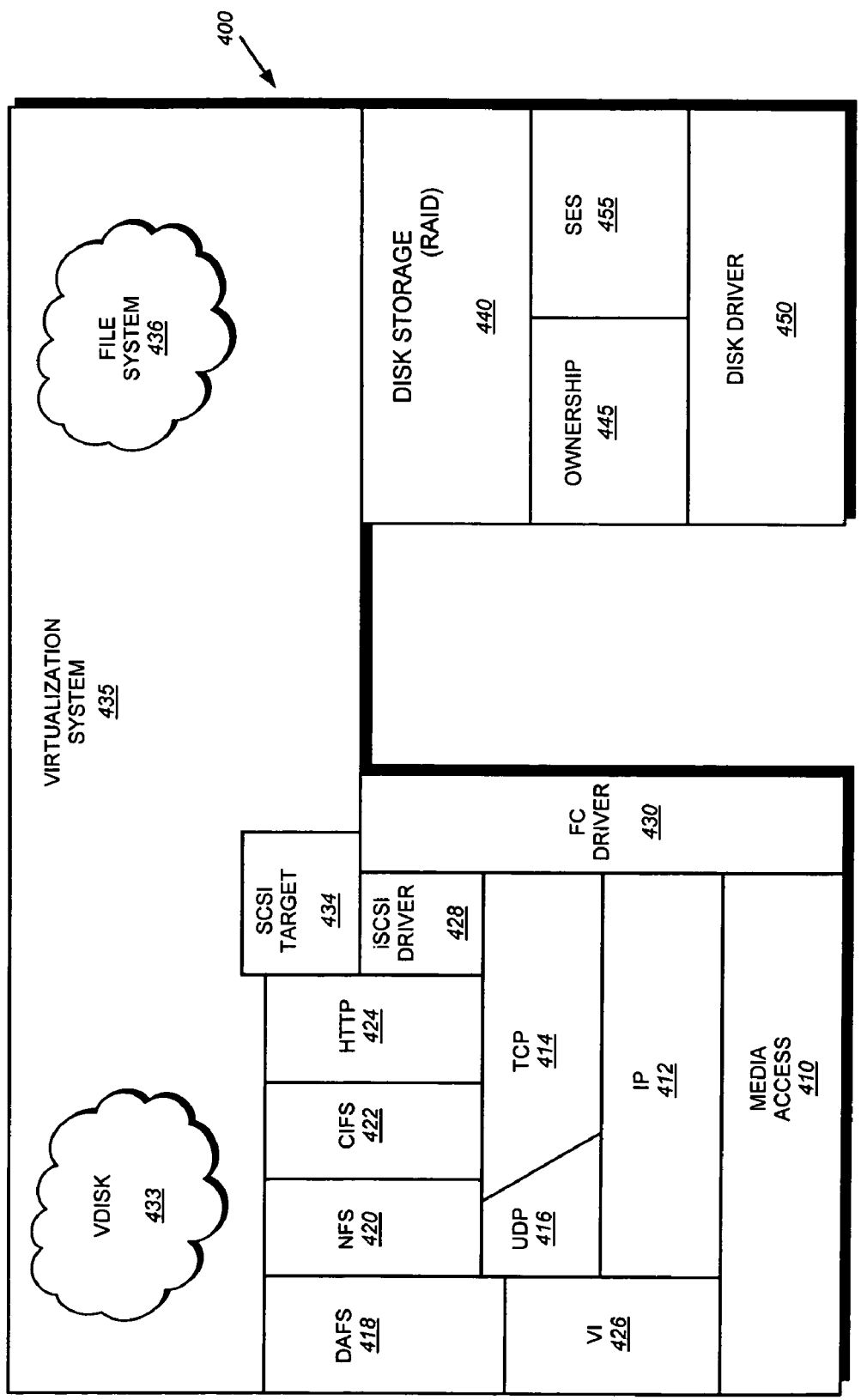
FIG. 4 is a schematic block diagram of an exemplary storage operating system in accordance with an embodiment of the present invention.

FIG. 4 is a schematic block diagram of the storage operating system 400 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the DAFS protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418.

An iSCSI driver layer 428 provides block protocol access over the TCP/IP network protocol layers, while a FC driver layer 430 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 440 that manages the storage and retrieval of information to and from the volumes/disks in accordance with I/O operations, and a disk driver system 450 that implements a disk access protocol such as, e.g., the SCSI protocol. Also included in the storage operating system 400 are a disk ownership module 445 and a SCSI enclosure services (SES) module 455. The disk ownership module 445 implements various disk ownership models of the storage system and, illustratively, implements the novel system and method for determining the proper disk ownership model of the present invention. The SES module 455 implements SCSI enclosure services for the storage system.

Bridging the disk software layers with the integrated network protocol stack layers is a virtualization system 435 that is implemented by a file system 436 interacting with virtualization modules illustratively embodied as, e.g., vdisk module 433 and SCSI target module 434. The vdisk module cooperates with the file system 436 to enable access by administrative interfaces, in response to a user (system administrator) issuing commands to the storage system. The SCSI target module 434 is disposed between the FC and iSCSI drivers 428, 430 and the file system 436 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 436 provides functions normally associated with a volume manager. These functions include (i) aggregation of the disks, (ii) aggregation of storage bandwidth of the disks, and (iii) reliability guarantees, such as mirroring and/or parity (RAID). The file system 436 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 104 is forwarded as a packet over the computer network 102 and onto the storage system 300 where it is received at the network adapter 325. A network driver (of layer 410 or layer 430) processes the packet and, if appropriate, passes it on to a network protocol and file access layer for additional processing prior to forwarding to the write-anywhere file system 436. Here, the file system generates operations to load (retrieve) the requested data from disk if it is not resident "in core", i.e., in memory 315. If the information is not in the memory, the file system 436 indexes into the inode file using the inode number to access an appropriate entry and retrieve a logical vbn. The file system then passes a message structure including the logical vbn to the RAID system 440; the logical vbn is mapped to a disk identifier and disk block number (disk,dbn) and sent to an appropriate driver (e.g., SCSI) of the disk driver system 450. The disk driver accesses the dbn from the specified disk and loads the requested data block(s) in memory 315 for processing by the storage system. Upon completion of the request, the storage system (and operating system) returns a reply to the client 104 over the network 102.

It should be further noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 300 in response to a request issued by client 104. Moreover, in another alternate embodiment of the invention, the processing elements of adapters, 325 may be configured to offload some or all of the packet processing and storage access operations, respectively, from processor 305, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a storage system, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage system, storage system or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled MULTI-PROTOCOL STORAGE APPLIANCE THAT PROVIDES INTEGRATED SUPPORT FOR FILE AND BLOCK ACCESS PROTOCOLS, by Brian Pawlowski, et al, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Determining Disk Ownership Model

The system and method of the present invention determine, upon storage system initialization, the appropriate disk ownership model to be utilized with the disks connected with the storage system, which utilizes the determined disk ownership model to complete the initialization procedure. During initialization, the disk ownership module 445 of a storage operating system 400 first scans all disks that can be accessed by the storage system to identify the disks. Then, for each identified disk, the disk ownership model reads predetermined ownership blocks (e.g. Sector S ownership blocks) from the selected disks and determines the disk ownership model of the disk.

Once all disks have been analyzed, the disk ownership module determines if the number of disks with Sector S ownership information set to the storage system as owner exceeds a first threshold value. If so, the module utilizes the Sector S ownership a model. If not, the disk ownership module then determines if the number of disks with Sector S ownership information, regardless of the owning storage system, exceeds a second threshold value. If so, the storage system utilizes the Sector S ownership model; otherwise, the storage system utilizes the conventional A/B ownership model. The threshold values are illustratively set so that if one or more disks are set with the Sector S ownership information and configured so that the initializing storage system is the owner, the storage system utilizes the Sector S ownership model. Additionally, if the number of disks having Sector S ownership information exceeds two, the storage system utilizes the Sector S ownership model. These thresholds may be modified by the system administrator.

Figure 5:
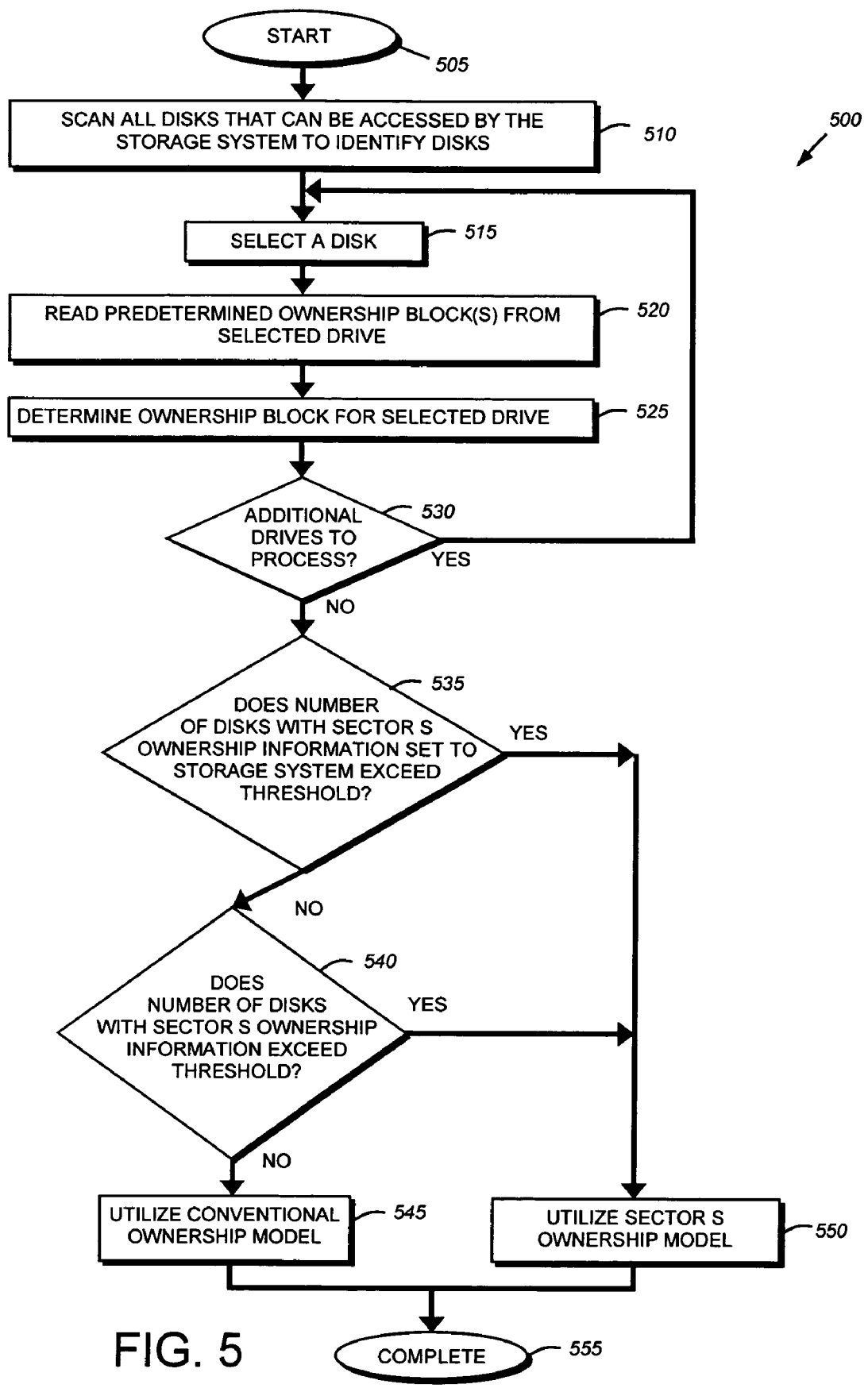
FIG. 5 is a flowchart detailing the steps of a procedure for determining a disk ownership model in accordance with an embodiment of the present invention.

FIG. 5 is a flowchart detailing the steps of a procedure 500 for determining the proper disk ownership model to utilize in accordance with an illustrative embodiment of the present invention. The procedure begins in step 505 and continues to step 510 where the storage system (e.g., disk ownership module 445) scans all of the disks that are accessible. This may be performed by, for example, utilizing conventional Fibre Channel operations to identify disks connected to the storage system. Once all of the disks have been identified, the ownership module then, in step 515, selects one of the disks and in step 520, reads a set of predetermined ownership blocks from the selected disk. In the illustrative embodiment, these predetermined ownership blocks comprise the blocks where the Sector S ownership information is stored. It should be noted that in alternate embodiments, other types of disk ownership blocks, other than Sector S, may be utilized. In these alternate embodiments, predetermined disk ownership models, other than Sector S, may be utilized. In these alternate embodiments, the predetermined disk ownership block(s) comprise the appropriate ownership block(s) for the disk ownership model utilized. Once the ownership blocks have been read, the ownership model for the selected disk drive is determined in step 525. This determination may be made by, for example, examining the predetermined ownership blocks to determine if they are Sector S ownership blocks. If the read blocks are Sector S ownership blocks, the disk is identified as a Sector S ownership disk and the ownership module 445 determines the owning storage system of the Sector S disk, e.g., by examining the serial number of the storage system stored in sector S.

Once the ownership for the selected drive has been determined (step 525), the ownership module determines if there are additional disk drives to be processed in step 530. If there are additional disks to be processed, the procedure loops back to step 515 and repeats for another disk drive.

If there are no additional disks to be scanned, the procedure continues to step 535 where a determination is made as to whether the number of disks with Sector S ownership information set to signify that the storage system is the owning storage system exceeds a first predetermined threshold value. In the illustrative embodiment, this first threshold value is set to one. Thus, in the illustrative embodiment, if any of the disks accessible by the storage system have Sector S ownership information that identifies the storage system as the owning storage system, then the threshold is exceeded. If the threshold is exceeded, the procedure branches to step 550 and the storage system utilizes the Sector S ownership model before completing in step 555.

If the threshold value is not exceeded in step 535, the procedure continues to step 540 where a determination is made as to whether the number of disks with Sector S ownership information, regardless of the owning storage system, exceeds a second predetermined threshold value. In the illustrative embodiment, this second threshold value is set to a value of two. If the threshold value is exceeded, the procedure branches to step 550 and the storage system utilizes the Sector S ownership model. The procedure then completes in step 555. If the second threshold value is not exceeded, the procedure continues to step 545 where the storage system utilizes the conventional ownership model, (e.g., the A/B ownership model). The procedure then completes in step 555.

Upon determining whether to utilize the Sector S ownership model (step 550) or the conventional ownership model (step 545), the storage operating system may then continue with a conventional initialization routine that determines which disks are owned by the storage system (using the determined disk ownership model), assimilating those disks into appropriate RAID groups and activating its root volume.

Figure 6:
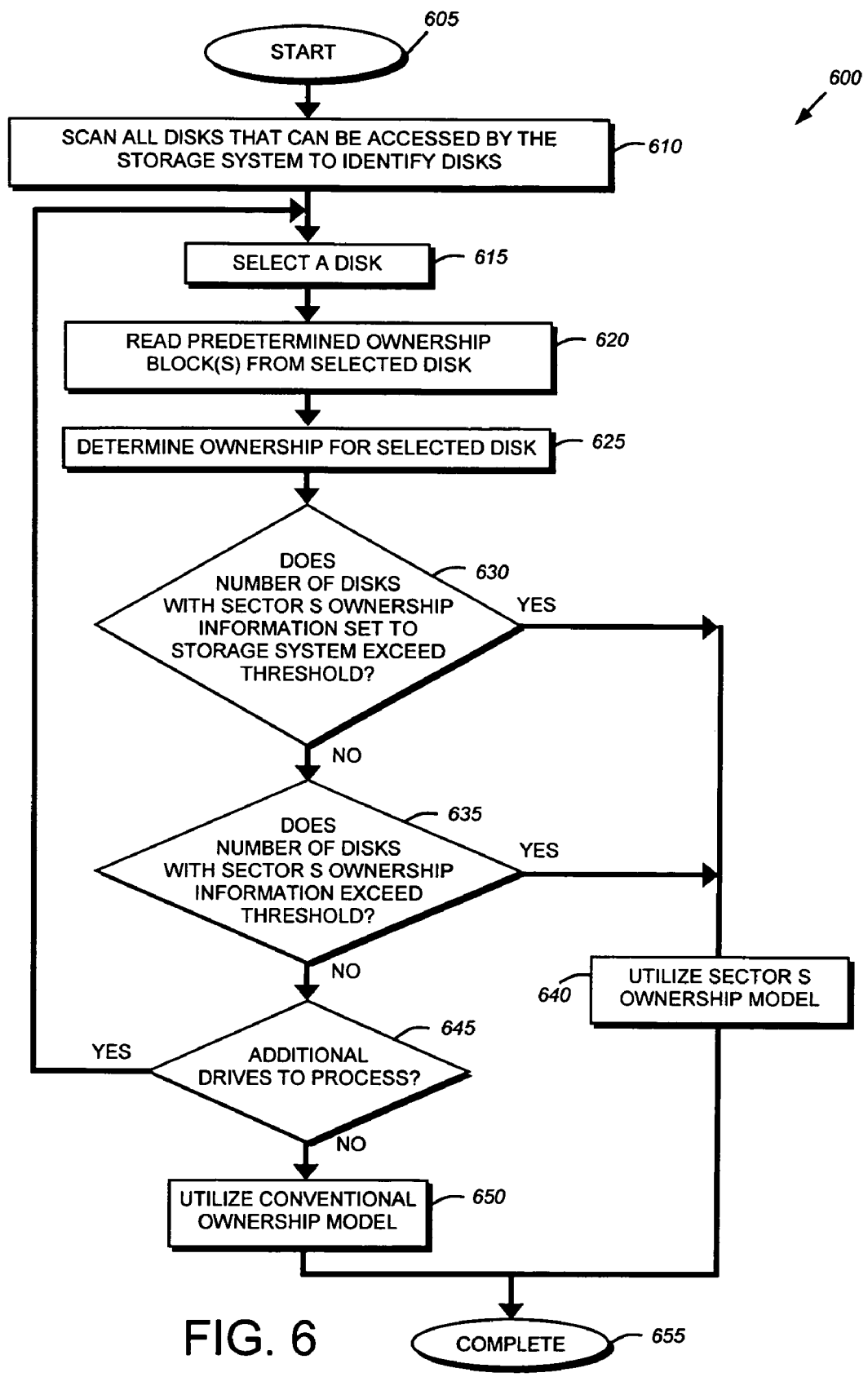
FIG. 6 is a flowchart detailing the steps of a procedure for determining a disk ownership model in accordance with an embodiment of the present invention.

FIG. 6 is a flowchart detailing the steps of a procedure 600 for determining the disk ownership model for use by a storage system in accordance with an alternate embodiment of the present invention. The procedure 600 is an optimized procedure as compared to the general procedure 500 described above in reference to FIG. 5. The procedure 600 begins in step 605 and continues to step 610 where the disks connected to the storage system are scanned for identification. In step 615, the storage system (e.g., disk ownership module) selects a disk and, in step 620, reads the predetermined ownership block(s) from the selected disk. The ownership module 445 then determines the ownership model for the selected disk in step 625. Note that, steps 605–625 are identical to steps 505–525 of procedure 500 described above in reference to FIG. 5.

In step 630, the ownership module determines if the number of disks with Sector S ownership information set to signify that the storage system is the owning storage system exceeds a first predetermined threshold. If the threshold is exceeded, the procedure branches to step 640 and the storage system utilizes (is assigned) the Sector S ownership model. The procedure then completes in step 655. If the threshold is not exceeded, the ownership module then checks, in step 635, whether the number of disks with Sector S ownership information, regardless of the owning storage system, exceeds a second predetermined threshold. If the threshold is exceeded, the procedure branches to step 640, where the storage system utilizes the Sector S ownership model. The procedure then completes in step 655.

If, in step 635, the second threshold is not exceeded, the procedure continues to step 645 where a determination is made as to whether there are additional disk drives to be processed. If there are additional disk drives to be scanned, the procedure branches back to step 615 where the ownership module selects another disk. If there are no additional drives to scanned, the procedure continues to step 650 and utilizes the conventional ownership model (e.g., the conventional A/B ownership model). The procedure completes in step 655.

As noted, the procedure 600 provides an optimization over the general procedure 500 described in FIG. 5 as procedure 600 makes a determination of utilizing the Sector S ownership model without having to read ownership information from all disks associated with the storage system. Only if the storage system is to utilize the conventional ownership model will the storage system have to access the ownership blocks from all disks associated or accessible by the storage system. Thus, procedure 600 does not require all disks to be accessed unless the storage system utilizes the conventional ownership model.

Figure 7:
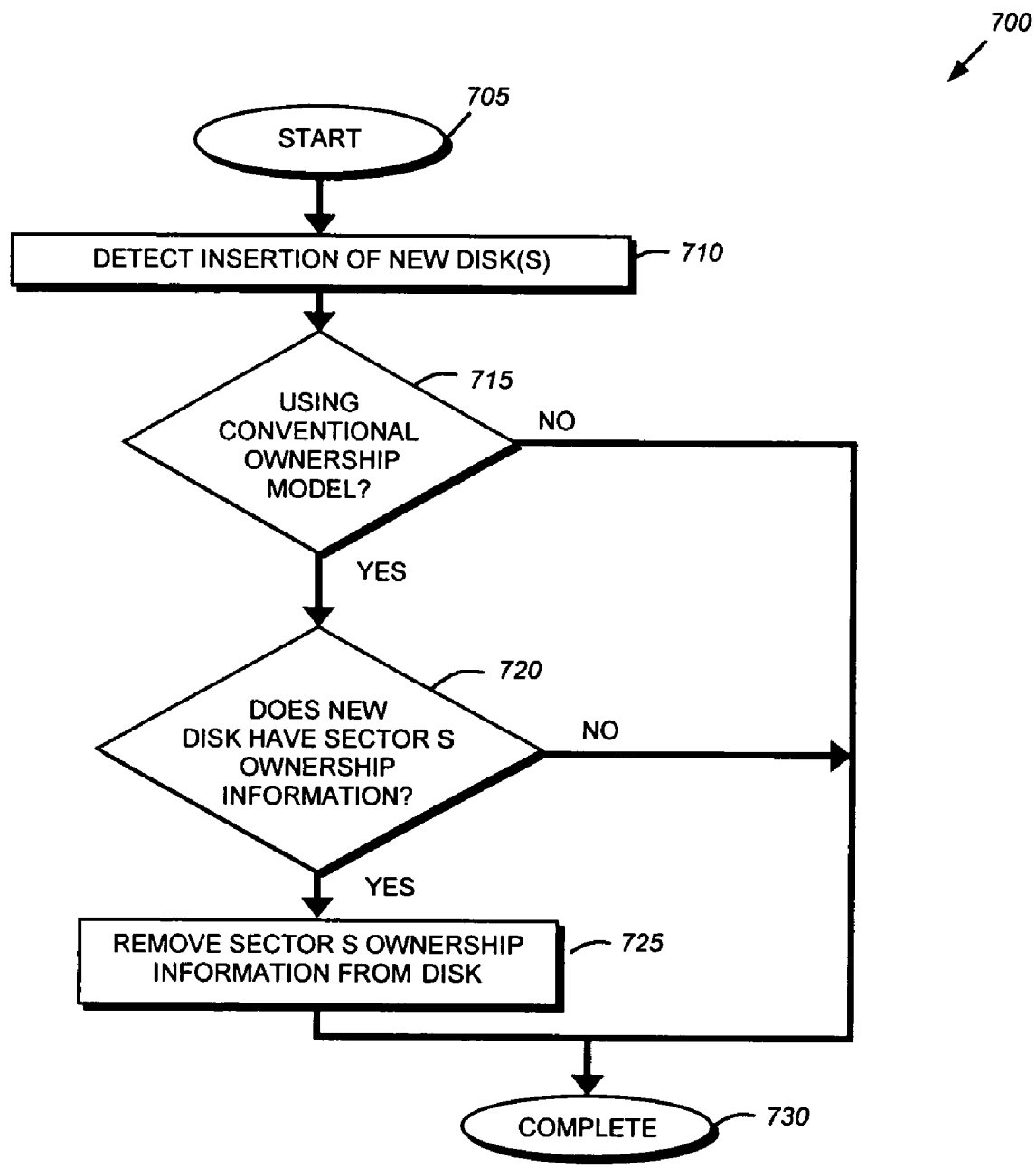
FIG. 7 is a flowchart detailing the steps of a procedure for cleaning disk ownership model information from disks in accordance with an embodiment of the present invention.

FIG. 7 is a flowchart detailing the steps of a procedure 700 performed by the storage operating system in accordance with an embodiment of the present invention. The procedure 700 begins in step 705 and continues its step 710 where the storage operating system detects the insertion of a new disk. In step 715, the storage operating system determines if the storage system is utilizing the conventional ownership model. If the storage system is not utilizing the conventional ownership model, the procedure completes in step 730. However, if the storage system is utilizing the conventional ownership model, the procedure continues to step 720 where the storage operating system determines if the new disk has Sector S ownership information stored therein. If the new disk does not have Sector S ownership information, the procedure then completes in step 730. However, if the new disk has Sector S ownership information, the procedure continues to step 725 and removes the Sector S ownership information from the disk before completing in step 730.

The procedure 700 is utilized by the storage system to ensure that if it is executing in a conventional ownership model and new disks are added, the new disks will not cause the storage system to re-initialize into a non-conventional model. For example, assume a storage system is utilizing conventional ownership model and two spare disks, which were previously used in a Sector S ownership model storage system environment, are attached to the storage system. Without the cleaning process 700, upon re-initialization of the storage system immediately thereafter, the storage system would detect, using the principles of the present invention, the two Sector S ownership disks and would utilize a Sector S ownership model, which would be an incorrect disk ownership model. However, the process 700 ensures that such incorrect selections will not occur.

To again summarize, the present invention is directed to a system and method for determining the appropriate disk ownership model to be utilized by a storage system. The system and method enables any storage system to determine the disk ownership model to be utilized during initialization of the storage system. During initialization, the storage system scans all disks accessible to it and reads predetermined ownership block(s) from each disk to determine the individual disk's ownership. Once the disks have been scanned, the storage system and determines if the number of disks utilizing a Sector S ownership model identifying that the storage system is the owner exceeds a first threshold value or if the number of disks utilizing a Sector S ownership model, regardless of the owning storage system, exceeds a second threshold value. If either of the threshold values are exceeded, the storage system utilizes the Sector S ownership model. If neither of the threshold values are exceeded, the storage system utilizes a conventional ownership model, e.g., the A/B ownership model.

While the present invention has been described in terms of a Sector S ownership model and A/B ownership model, the principles of the present invention may be adapted to any set of ownership models that may be detected during initialization of the storage system. As such, the use of a Sector S and/or A/B ownership model is be taken as exemplary only and should not limit the scope of the invention. The principles of the present invention may be applied to determining the appropriate disk ownership model for any disk ownership that includes a set of predefined ownership attributes, such as the Sector S ownership information.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for determining a disk ownership model to utilize with a storage system, the method comprising the steps of:

identifying all disks accessible by the storage system;

for each identified disk, reading predetermined ownership information from the identified disk and determining ownership attributes for the identified disk;

for each of one or more sets of ownership attributes, determining if a number of disks with one of the one or more sets of ownership attributes exceeds a first predetermined threshold value for the set of ownership attributes;

in response to determining that the number of disks with one of the one or more sets of ownership attributes exceeds the first predefined threshold value, utilizing an ownership model associated with the one of the one or more sets of the ownership attributes; and in response to determining that a number of disks with one of the one or more sets of ownership attributes does not exceed the first predetermined threshold value for any of the one or more set of ownership attributes, utilizing a predefined ownership model.

2. The method of claim 1 wherein the predetermined ownership information comprises Sector S ownership information.

3. The method of claim 1 wherein one of the one or more sets of ownership attributes comprises a disk having predetermined ownership information identifying the storage system as an owner of the disk.

4. The method of claim 1 wherein one of the one or more sets of ownership attributes comprises a disk having predetermined ownership information identifying a storage system other than the storage system as an owner of the disk.

5. The method of claim 1 wherein the predefined ownership model utilizes a determination of physical connection to determine disk ownership.

6. A system for determining a disk ownership model to utilize with a storage system, the system comprising:
   means for identifying all disks accessible by the storage system;
   means for reading, for each identified disk, predetermined ownership information from the identified disk and determining ownership attributes for the identified disk;
   means for determining, for each of one or more sets of ownership attributes, if a number of disks with one of the one or more sets of ownership attributes exceeds a first predetermined threshold value for the set of ownership attributes;
   means for utilizing, in response to determining that the number of disks with one of the one or more sets of ownership attributes exceeds the first predetermined threshold value, an ownership model associated with the one of the one or more sets of the ownership attributes; and
   means for utilizing a predefined ownership model in response to determining that a number of disks with one of the one or more sets of ownership attributes does not exceed the first predetermined threshold value for any of the one or more set of ownership attributes.

7. The system of claim 6 wherein the predetermined ownership information comprises Sector S ownership information.

8. The system of claim 6 wherein one of the one or more sets of ownership attributes comprises a disk having predetermined ownership information identifying the storage system as an owner of the disk.

9. The system of claim 6 wherein one of the one or more sets of ownership attributes comprises a disk having predetermined ownership information identifying a storage system other than the storage system as an owner of the disk.

10. The system of claim 6 wherein the predefined ownership model utilizes a determination of physical connection to determine disk ownership.

11. A computer readable medium for determining a disk ownership model to utilize with a storage system, the computer readable medium including program instructions for performing the steps of:
   identifying all disks accessible by the storage system;
   for each identified disk, reading predetermined ownership information from the identified disk and determining ownership attributes for the identified disk;
   for each of one or more sets of ownership attributes, determining if a number of disks with one of the one or more sets of ownership attributes exceeds a first predetermined threshold value for the set of ownership attributes;
   in response to determining that the number of disks with one of the one or more sets of ownership attributes exceeds the first predetermined threshold value, utilizing an ownership model associated with the one of the one or more sets of the ownership attributes; and
   in response to determining that a number of disks with one of the one or more sets of ownership attributes does not exceed the first predetermined threshold value for any of the one or more set of ownership attributes, utilizing a predefined ownership model.

12. The computer readable medium of claim 11 wherein the predetermined ownership information comprises Sector S ownership information.

13. The computer readable medium of claim 11 wherein one of the one or more sets of ownership attributes comprises a disk having predetermined ownership information identifying the storage system as an owner of the disk.

14. The computer readable medium of claim 11 wherein one of the one or more sets of ownership attributes comprises a disk having predetermined ownership information identifying a storage system other than the storage system as an owner of the disk.

15. The computer readable medium of claim 11 wherein the predefined ownership model utilizes a determination of physical connection to determine disk ownership.

16. A system for determining a disk ownership module comprising:
   a plurality of disks;
   a storage system including a storage operating system having a disk ownership module adapted to determine a disk ownership model by:
   (i) identifying all disks accessible by the storage system;
   (ii) for each identified disk, reading predetermined ownership information from the identified disk and determining ownership attributes for the identified disk;
   (iii) for each of one of more sets of ownership attributes, determining if a number of disks with one of the one or more sets of ownership attributes exceeds a first predetermined threshold value for the set of ownership attributes;
   (iv) in response to determining that the number of disks with one of the one or more sets of ownership attributes exceeds the first predetermined threshold value, utilizing an ownership model associated with the one of the one or more sets of the ownership attributes; and
   (v) in response to determining that a number of disks with one of the one or more sets of ownership attributes does not exceed the first predetermined threshold value for any of the one or more set of ownership attributes, utilizing a predefined ownership model.

17. The system of claim 16 wherein the predetermined ownership information comprises Sector S ownership information.

18. The system of claim 16 wherein one of the one or more sets of ownership attributes comprises a disk having predetermined ownership information identifying the storage system as an owner of the disk.

19. The system of claim 16 wherein one of the one or more sets of ownership attributes comprises a disk having predetermined ownership information identifying a storage system other than the storage system as an owner of the disk.

20. The system of claim 16 wherein the predefined ownership model utilizes a determination of physical connection to determine disk ownership.

* * * * *